United States Patent [19]

Witenhafer et al.

[11] 4,024,301
[45] May 17, 1977

[54] INTERNALLY COATED REACTION VESSEL FOR USE IN OLEFINIC POLYMERIZATION

[75] Inventors: Donald E. Witenhafer, North Olmsted; James B. Haehn; Louis Cohen, both of Avon Lake, all of Ohio

[73] Assignee: The B. F. Goodrich Company, Akron, Ohio

[22] Filed: May 2, 1975

[21] Appl. No.: 574,037

[52] U.S. Cl. .............................. 427/230; 23/252 A; 23/285; 260/29.2 N; 427/236; 526/62
[51] Int. Cl.$^2$ ................... B05D 7/22; C08F 114/00
[58] Field of Search ............ 427/230, 239; 428/35; 260/29.2 N, 47 R, 92 AW; 23/285, 252 A; 526/62

[56] References Cited
UNITED STATES PATENTS

| | | | |
|---|---|---|---|
| 2,163,639 | 6/1939 | Von Bramer et al. | 260/47 R |
| 3,440,197 | 4/1969 | Boldebuck | 260/29.2 N |
| 3,515,709 | 6/1970 | Nelson et al. | 260/92.8 W |
| 3,678,006 | 7/1972 | Bilow | 260/47 R |
| 3,738,974 | 6/1973 | Takehisa et al. | 23/285 X |
| 3,778,423 | 12/1973 | Reiter | 260/92.8 W |
| 3,849,179 | 11/1974 | Morningstar | 427/230 X |

*Primary Examiner*—Ronald H. Smith
*Assistant Examiner*—Stuart D. Frenkel
*Attorney, Agent, or Firm*—Roy P. Wymbs

[57] ABSTRACT

This invention relates to a polymerization reaction vessel having a coating on the inner surfaces thereof resulting from applying thereto a coating composition containing, as a primary ingredient, a straight chain or branched polyaromatic amine dissolved in an aqueous alkali metal hydroxide solution. When polymerizing olefinic monomers, such as vinyl halides, vinylidene halides, and vinylidene monomers having at least one terminal $CH_2=C<$ grouping, and mixtures thereof, in the presence of said coating, polymer build-up on the inner surfaces of the reaction vessel is substantially eliminated. Further, multiple charges or batches of polymer can be made in said internally coated reaction vessel without opening the same between charges thus preventing the escape of unreacted monomer to the atmosphere.

25 Claims, No Drawings

INTERNALLY COATED REACTION VESSEL FOR USE IN OLEFINIC POLYMERIZATION

CROSS REFERENCE TO RELATED APPLICATIONS

Related applications for U.S. patent are Ser. No. 507,129, filed Sept. 18, 1974, in the names of Henry J. Kehe and Marion G. Morningstar, now abandoned Ser. No. 566,086, filed Apr. 8, 1975, same inventors, now abandoned which is a continuation-in-part of Ser. No. 507,129; and Ser. No. 607,262, filed Aug. 26, 1975, same inventors, which is a continuation-in-part of Ser. No. 566,086.

BACKGROUND OF THE INVENTION

Various type chemical processes are commonly carried out in large, stirred vessels which are frequently provided with auxiliary equipment, such as baffles, heat transfer coils which enable heat to be supplied or extracted from the contents of the vessels, and the like. In many cases, however, such processes eventually produce undesirable deposits on the surfaces of the equipment with which the reaction mixtures come into contact. Such deposits interfere with the efficient transfer of heat to and from the interior of the vessels. Further, these deposits have a tendency to deteriorate and to partially fragment resulting in contamination of the reaction mixture and the products produced therefrom. This problem is particularly prevalent in polymerization type reactions, since the deposits, or "build-up", of solid polymer on reactor surfaces, not only interferes with heat transfer, but decreases productivity and adversely affects polymer quality.

This problem is particularly bad in the commercial production of polymers and copolymers of vinyl and vinylidene halides, when polymerized alone or with other vinylidene monomers having a terminal $CH_2=C<$ group, or with polymerizable polyolefinic monomers. For example, in the commercial production of vinyl chloride polymers, the same are usually produced in the form of discrete particles by polymerization in aqueous suspension systems. When employing such a polymerization system, the vinyl chloride, and other comonomers when used, are maintained in the form of small discrete droplets by the use of suspending agents and agitation. When the reaction is complete, the resultant polymer is washed and dried. These aqueous suspension system polymerization reactions are usually conducted under pressure in metal reactors equipped with baffles and high speed agitators. However, these suspension systems are inherently unstable and during the polymerization reaction, vinyl chloride polymer builds up on the interior surfaces of the polymerization reactor, including the surfaces of the baffles and agitator. Obviously, this polymer build-up must be removed since it results in further formation of polymer build-up which in turn results in a crust that adversely affects heat transfer and contaminates the polymer being produced.

The nature of the polymer build-up, or insoluble deposit on the walls of the reactor, is such that in the commerical production of polymers, as described above, it has in the past been standard practice, after each polymerization reaction is completed, to have an operator enter the reactor and scrape the polymer build-up off the walls and off the baffles and agitator. An operation such as this is not only costly, both in labor and down-time of the reactor, but presents potential health hazards as well. While various methods have heretofore been proposed to reduced the amount and nature of polymer build-up on polymerization reactor surfaces, such as solvent cleaning, various hydraulic and mechanical reactor cleaners, and the like, none has proved to be the ultimate in polymer build-up removal. That is to say, these various methods and apparatus have done an acceptable job, but there is still room for improvement in this area, particularly from an economic point of view.

In copending application for U.S. patent, Ser. No. 507,129, filed Sept. 18, 1974, in the names of Henry J. Kehe and Marion G. Morningstar, there is disclosed and claimed a reactor coating composition containing the condensation polymer made from m-phenylenediamine and resorcinol. The coating is applied to the reactor surfaces from an organic solvent solution thereof. This coating composition has proved to be more than satisfactory for the purpose intended. However, experience has shown that it would be more practical and economical to find a coating that could be applied to said surfaces from an aqueous solution.

SUMMARY OF THE INVENTION

It has been found that if a reaction vessel has been previously coated on the interior surfaces with the proper coating, undesirable polymer build-up on said surfaces can be substantially decreased, and in some cases entirely eliminated, when polymerizing olefinic monomers therein. We have found that when the interior surfaces of a reactor are coated with a coating composition comprising a straight chain or branched polyaromatic amine dissolved in an aqueous alkali metal hydroxide solution, polymer build-up on said surfaces of the reactor is essentially eliminated. Due to the nature of the coating composition, it can be applied to the inner surfaces of the reactor without opening the same thus providing a closed polymerization system. In polymerizing the olefinic monomers, the same is done in an aqueous polymerization medium which is kept in constant contact with said coated surfaces throughout the polymerization reaction.

DETAILED DESCRIPTION

In accordance with the present invention, a film or coating of a polyaromatic amine is applied to the interior surfaces of a polymerization reactor or vessel by merely contacting said surfaces with an aqueous alkali metal hydroxide solution of said polyaromatic amine. Likewise, all exposed surfaces in the interior of the reactor, other than the walls, such as the baffles, agitator, and the like, are also treated in like manner. After the aqueous alkali metal hydroxide solution has been applied to said surfaces, the polymerization medium can be introduced to the reactor and the reaction started without the necessity of drying the surfaces prior to said introduction of the polymerization medium. However, it is preferred, and the best results are obtained, when after the application of the polyaromatic amine to the interior surfaces of the reactor, the surfaces are sprayed with water or the reactor is filled with water and drained, thereby, surprisingly, leaving on said surfaces a tightly adhering coating or film which is not affected by the polymerization medium, in the sense of preventing it from achieving its assigned function, namely, the prevention of polymer build-up on said surfaces.

The exact mechanism by which the polyaromatic amine coating or film functions to prevent build-up of polymeric scale on the interior surfaces of the reaction vessel is not certain but it is believed to be a free radical destroying mechanism or free radical trapping mechanism. This is believed to be so because aromatic diamines are known to destroy free radicals, for example, as in their well-known activity as antioxidants. Thus, with the destruction of the free radicals by the polyaromatic amine coating or film, polymerization on the interior surfaces of the reactor is inhibited.

The polyaromatic amines useful in the practice of the present invention are made by means of a condensation reaction of two or more of the compounds listed below or by the self-condensation reaction of any of the compounds listed below containing at least one -OH group and at least one -NH₂ group. Generally, such reactions are carried out with heat in the presence of an acidic catalyst. The polyaromatic amines thus formed have the following general structures:

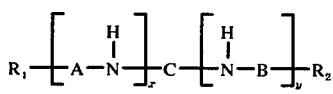
(I)

wherein A, B and C are either

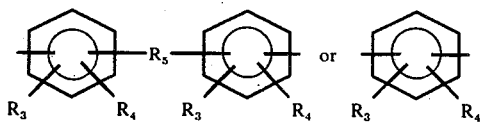

wherein $R_3$ and $R_4$ are the same as defined below, and $R_5$ is

or a straight chain or branched alkylene or alkylidene group containing from 1 to 5 carbon atoms, and wherein A, B and C may be the same or different and each repeating unit may be the same or different; $R_1$ and $R_2$ are either —H, —OH, —NH₂ or

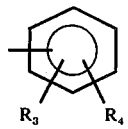

and may be the same or different; $R_3$ is —H, halogen, or an alkyl group containing from 1 to 8 carbon atoms and may be the same or different; $R_4$ is —H, —OH, —NH₂, or an alkyl group containing from 1 to 8 carbon atoms and may be the same or different; $x$ is an integer from 1 to 20; and $y$ is an integer from 0 to 20. When a trifunctional compound is employed, such as the trihydroxy benzenes, for example, then branched chains will result thus producing a branched polyaromatic amine; and

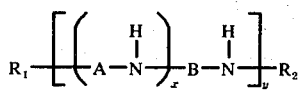
(II)

wherein A and B are either

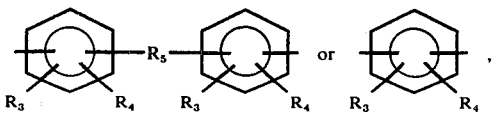

wherein $R_3$, $R_4$ and $R_5$ are the same as in formula (A), and wherein A and B may be the same or different and each repeating unit may be the same or different; $R_1$ is —H, —OH, —NH₂ or

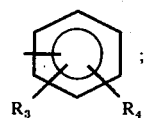

$R_2$ is —H, or

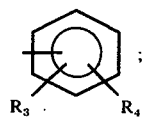

$x$ is an integer from 1 to 4; and $y$ is an integer from 1 to 15.

The compounds generally useful in making the polyaromatic amines employed in the present invention are (a) the polyamino benzenes having the formula:

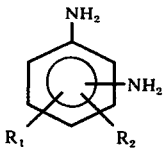

wherein $R_1$ is —H, —NH₂, —OH or an alkyl group containing from 1 to 8 carbon atoms, and $R_2$ is —H, halogen, or an alkyl group as defined for $R_1$, such as, for example, ortho, meta and paraphenylene diamines; diamino toluenes, diamino xylenes, diamino phenols, triamino benzenes, toluenes and xylenes; ethyl, propyl, butyl and pentyl di- and tri-amino benzenes; and the like; the most preferred compounds being those in which $R_1$ is —H and $R_2$ is —H, methyl, or ethyl; (b) the polyhydric phenols having the formula

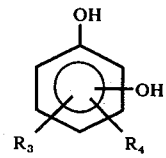

wherein $R_3$ is —H, —NH₂, —OH, or an alkyl group containing from 1 to 8 carbon atoms, and $R_4$ is —H, —OH, halogen, or an alkyl group as defined for $R_3$, such as, for example, catechol, resorcinol, chlororesorcinol, hydroquinone, phloroglucinol, pyrogallol, etc.; dihydroxy toluene and xylenes; trihydroxy toluenes and xylenes; ethyl, propyl, butyl and pentyl di- and tri-hydroxy benzenes; and the like, the most preferred compounds being those in which $R_3$ is —H and $R_4$ is —H or —OH; (c) the aminophenols and alkyl-substituted aminophenols having the formula

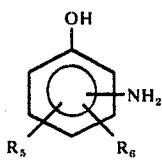

wherein $R_5$ is —H, —NH$_2$, —OH or an alkyl group containing from 1 to 8 carbon atoms, and $R_6$ is —H, —NH$_2$, halogen or an alkyl group as defined for $R_5$, such as, for example, ortho, meta, and para-aminophenols; diamino- and triamino- phenols; methyl, ethyl, propyl, butyl and pentyl amino and diaminophenols; and the like, the most preferred compounds being those in which $R_5$ is —H and $R_6$ is —H or —NH$_2$; and (d) diphenylamines, alkyl-substituted diphenylamines and other compounds having the formula

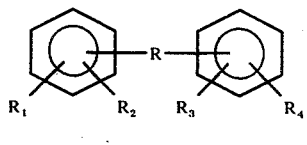

wherein R is

or a straight chain or branched alkyl group containing from 1 to 5 carbon atoms, and $R_1$, $R_2$, $R_3$ and $R_4$ may each be —H, —NH$_2$, —OH, halogen or an alkyl group containing from 1 to 8 carbon atoms and at least two are —NH$_2$, —OH or one of each, such as, for example, bis-phenol A, and the like, the most preferred compounds being those in which $R_1$ and $R_4$ are —OH or —NH$_2$ and $R_2$ and $R_3$ are —H.

The halogen in the above formulas may be chlorine, bromine, iodine, or fluorine.

The molecular weight or degree of condensation of the polyaromatic amine depends upon the ratio in which the reactants are combined, the time and temperature of heating, and the kind and concentration of the catalyst. Usually, when reacting two or more compounds together they are employed in approximatley equal molar proportions. However, in order for the resultant product to be soluble in aqueous alkali metal hydroxide solutions, there must be sufficient hydroxyl groups present on the aromatic nucleii. Accordingly, it is preferred to employ amounts of the starting materials and choose reaction conditions such that a polyaromatic amine is obtained having a maximum number of molecules terminated at both ends by hydroxyl groups. On the other hand, if $R_1$ and $R_2$ are —NH$_2$ groups, then sufficient of the $R_3$ and $R_4$ groups must be hydroxyl to give the necessary solubility. We have found that about 2 or more —OH groups per 1000 molecular weight are required. It is the acidity of such hydroxyl groups that enhances the solubility of the polyaromatic amine in aqueous alkali metal hydroxide solutions, such as sodium hydroxide, for example.

Further, the molecular weight can be regulated by using small amounts of mono-functional compounds. For example, one can use small amounts of an aromatic monoamine or a phenol to cap the polymerization and thereby control the molecular weight. Polyaromatic amines having a molecular weight greater than about 250 are satisfactory for use in the present invention. The upper limit of molecular weight will vary depending upon the particular compound or compounds used in making the polyaromatic amine. Suffice it to say that the particular polyaromatic amine should have a molecular weight such that it is workable and soluble in an aqueous alkali metal hydroxide solution so that it can be easily applied to the inner surfaces of the reactor. We have found that polyaromatic amines having a molecular weight in the range of about 250 to about 1000 are preferred.

While all of the previously described polyaromatic amines are useful in the practice of the present invention, particularly useful polyaromatic amines are those obtained when an aromatic diamine and a polyhydric phenol are reacted together. Usually these compounds are reacted together in approximately equal molar ratio. However, one can use an excess of either the diamine or the phenol. The only difference is that when an excess of the polyhydric phenol is employed, polyaromatic amines are obtained which have a somewhat higher softening point than those made in the presence of an excess of the aromatic diamine. While some of the polyaromatic amines useful in the present invention do not have a definite softening point, it has been found that among the solid polyaromatic amines those having a softening point in the range of about 65° C. to about 150° C. are most satisfactory.

The softening point of the polyaromatic amine, as used herein, is determined as follows: the polyaromatic amine is melted and cast into a split aluminum mold to make a cube which is ½ inch on a side. The mold is cooled, the cube removed therefrom and allowed to cool thoroughly. The cube is then attached to a thermometer bulb by heating the bulb to a temperature in excess of the expected softening point and laying it on the side of the cube, then cooling to 35° C. The thermometer with the cube attached is inserted into a mercury bath which has been preheated to 35° C. The insertion is made so that the top face or side of the cube is 1 inch below the mercury surface. The mercury bath is then heated at a rate of 4° C. per minute. The softening point is determined as the temperature at which, as the cube moves upward, the cube just breaks the surface of the mercury. It is to be noted that the cube should crawl up on the thermometer and not "pop-up". This is accomplished by carefully controlling the rate of rise in temperature of the mercury bath.

Again it is reiterated that many polyaromatic amines useful in the practice of the present invention do not have definite softening points but are viscous, flowable materials which are normally solid at room temperature. However, when these polyaromatic amines are dissolved in an aqueous alkali metal hydroxide solution and deposited on the internal surfaces of a reactor, they leave a monomer- and water-insoluble film thereon thus accomplishing the objectives of the invention.

When the above-identified compounds are self-condensed, or reacted with one or more other compounds, an acid catalyst is employed. We have found HCl to be the most effective catalyst. However, other useful catalysts may likewise be employed, such as, for example, methane sulfonic acid, benzene sulfonic acid, sulfanilic acid, phosphoric acid, iodine, benzene disulfonic acid, hydrogen bromide (HBr), hydrogen iodide (HI), aluminum chloride, and the like. The concentration of catalyst will vary depending upon the particular one used. It has been found, however, that a catalyst concentration of from about 0.005 mole to about 0.20 mole per mole of the compound being self-condensed, or per mole of the amino compound when one or more compounds are being reacted, is satisfactory. At any rate, the amount of catalyst employed is not critical.

The temperature of the reaction of the compounds, either alone or with others, will vary depending upon the time of the reaction and the molecular weight desired in the final product. For example, one can heat the reaction ingredients to 315° C. rapidly and then hold at that temperature for various periods of time. Also, the reaction ingredients can be heated to various temperatures above 300° C. and immediately cooled. When this latter procedure is employed, we define the time of reaction as 0 hours. Accordingly, the temperature of the reaction will vary from about 150° C. to about 360° C. and the time of reaction will vary from about 0 hour to about 3 hours. The preferred range of reaction temperature is from 175° C. to 330° C. and the time of reaction from 0 hour to 1 hour. It is understood, of course, that the particular time and temperature selected is dependent upon the catalyst employed and the final molecular weight of the polyaromatic amine desired.

The polyaromatic amine coating solution is made by conventional methods, using heat and agitation where necessary. The polyaromatic amine is dissolved in the appropriate aqueous alkali metal hydroxide solution to an extent such that the solids content of the coating solution does not prevent it being sprayed on the inner surfaces of the reactor through spray nozzles mounted permanently thereon. Usually a coating solution having a solids content of polyaromatic amine in the range of about 0.1% to about 20.0% by weight is satisfactory. However, the solids content depends upon the molecular weight of the polyaromatic amine. That is, the solids content could, in certain instances, be greater than 20.0% or less than 0.1% by weight. In addition, additives may be employed in the coating solution, if desired, such as plasticizers, stabilizers, lubricants, or fillers, and the like. Of course, when additives are employed, suitable adjustment in the solids content of the coating solution is made.

The aqueous metal hydroxide solutions used in making the coating solutions of the instant invention are those made from a metal in Group 1A of the periodic system. For example, such hydroxides as sodium hydroxide, lithium hydroxide, potassium hydroxide, rubidium hydroxide, cesium hydroxide, and francium hydroxide. Aqueous solutions of other compounds may also be used. For example, aqueous solutions of quaternary amines, such as the tetraalkyl ammonium hydroxides, and the like, or other alkali metal salts, such as phosphates, for example, trisodium phosphate, and the like. We have found that the important point is that the compound chosen must, in aqueous solution, have a sufficiently high basicity or pH, usually about 12.4 or higher. However, it is believed that some compounds having a pH lower than 12.4 would be operable in the present invention.

The temperature of the aqueous alkali metal hydroxide solution when the polyaromatic amine is dissolved therein is not critical. Usually a temperature in the range of about 0° C. to about 100° C. is satisfactory. Agitation during dissolution of the polyaromatic amine is desirable and in some instances necessary when the polyaromatic amine is of a high molecular weight. In order to obtain the desired results, the concentration of the alkali metal hydroxide in the aqueous solution may be varied between about 0.1% by weight to about 25.0% by weight. The preferred concentration of alkali metal hydroxide is from 0.5% to 5.0% by weight.

As previously pointed out, the coating solution is usually applied to the inner reactor surfaces by spraying. However, it is also possible to apply the coating solution by flooding the reactor and then draining but spraying is the most practical and economical method of application. After spraying the coating solution on the inner surfaces and draining the reactor, the polymerization reaction can be started immediately without further treatment of said surfaces. However, it has been found that best results are obtained when after applying the coating solution to the surfaces of the reactor, the surfaces are sprayed with water and the reactor drained prior to charging the reactor with the polymerization mix. The present coating works equally well on glass or metal surfaces, such as stainless steel, and the like.

The spraying of the coating solution on the inner surfaces of the reactor with water is believed to have a non-solvent effect causing the polyaromatic amine to precipitate and adhere to the reactor surfaces. This is believed to be so since it has been found that the polyaromatic amine comes out of solution on dilution with water of the aqueous alkali metal hydroxide coating solution. While the exact adhesion mechanismm of the coating to the surface is not known for certain, it is believed to involve some type of electrical force or adsorption between the reactor surfaces and the polyaromatic amine. At any rate, the coating composition of the present invention does substantially eliminate polymer build-up on the reactor surfaces and what little polymer build-up, if any, that may occur, is of the sandy type which is of such a nature that it is readily removable from the reactor surfaces. The polymer build-up to be avoided is what is referred to as "paper build-up" since this type of build-up is very difficult to remove and usually requires hand scraping or a high pressure jet stream of water or other liquid. In either event, the reactor must be opened in order to clean the same which, of course, allows the escape into the atmosphere of unreacted vinyl chloride.

In accordance with this invention, several polymerizations may be run in a coated reactor before having to recoat the surfaces thereof. However, we have found it expeditious, and it is preferred, to coat the internal surfaces of the reactor after each polymerization run therein. This has the distinct advantage of substantially eliminating the escape of unreacted monomer vapors to the surrounding atmosphere, which under present day Governmental regulations must be kept to a minimum. As previously pointed out, with the spray nozzles permanently mounted at strategic points on the reactor, it is possible to reach all inner surfaces thereof. After each polymerization is complete and the reactor is drained, the inner surfaces are sprayed with water and the reactor flushed. Then the coating solution is sprayed on the surfaces and the reactor is drained of the excess solution in such a way that the solution can be sent to a recovery system, if desired. Then the surfaces are sprayed with water and the effluent is discarded, or recovered, if desired. Thereafter, the reactor is charged with the polymerization medium and ingredients in the usual manner and the polymerization reaction commenced. This cycle of operation is repeated after each polymerization run without opening the reactor.

After each application of the coating composition on the interior surfaces of the reaction vessel and spraying thereof with water the reaction to be carried out in the equipment may be commenced immediately, no particular modification of processing techniques being required due to the presence of the coating. Further, utilization of the internally coated reaction vessel of the present invention does not adversely affect the heat stability or other physical and chemical properties of the polymers produced therein.

While the present invention is specifically illustrated hereinafter with regard to the suspension polymerization of vinyl chloride, it is to be understood that the apparatus and process may likewise be applied in the dispersion, emulsion, or suspension polymerization of any polymerizable ethylenically unsaturated monomer or monomers where undesirable polymer build-up occurs. Examples of such monomers are other vinyl halides and vinylidene halides, such as vinyl bromide, vinylidene chloride, etc.; vinylidene monomers having at least one terminal $CH_2=C<$ grouping, such as esters of acrylic acid, for example, methyl acrylate, ethyl acrylate, butyl acrylate, octyl acrylate, cyanoethyl acrylate, and the like; vinyl acetate; esters of methacrylic acid such as methyl methacrylate, butyl methacrylate, and the like; styrene and styrene derivatives including α-methyl styrene, vinyl toluene, chlorostyrene; vinyl naphthalene; diolefins including butadiene, isoprene, chloroprene, and the like; and mixtures of any of these types of monomers and other vinylidene monomers copolymerizable therewith; and other vinylidene monomers of the types known to those skilled in the art.

The present invention, however, is particularly applicable to the suspension polymerization of vinyl chloride, either alone or in admixture with one or more other vinylidene monomers having at least one terminal $CH_2=C<$ grouping, copolymerizable therewith in amounts as great as about 80% or more by weight, based on the weight of the monomer mixture, since polymer build-up in the reaction vessel is a particularly bad problem here.

In the present invention, the polymerization process is usually conducted at a temperature in the range of about 0° C. to about 100° C. depending upon the particular monomer or monomers being polymerized. However, it is preferred to employ temperatures in the range of about 40° C. to about 70° C., since, at these temperatures polymers having the most beneficial properties are produced. The time of the polymerization reaction will normally vary from about 2 to about 15 hours.

The polymerization process may be carried out at autogenous pressures although superatmospheric pressures of up to 10 atmospheres or more may be employed with some advantage with the more volatile monomers. Superatmospheric pressures may also be employed with those monomers having the requisite volatilities at reaction temperatures permitting reflux cooling of the reaction mixture.

Further, the polymerization process may be carried out utilizing a full reactor technique. That is, the reaction vessel is completely filled with the polymerization medium and kept that way throughout the reaction by constant addition thereto of water or additional make-up liquid containing the monomer or monomers in the same proportion as at start-up. Upon the addition of a certain predetermined amount of liquid, the polymerization reaction is terminated, usually by the addition thereto of a short-stopping agent. The necessity for the addition of liquid is due to the shrinkage in volume of the reaction medium produced by the conversion of the monomer or monomers to the polymeric state.

In order to rate the various coatings, as particularly set forth in the specific examples which follow hereinafter, we have devised a rating scale with respect to paper and sandy build-up, as described above. An uncoated reactor, where normal amounts of both types of build-up occurs, is given a rating of 1.5. Any rating below 1.0 is good or a definite improvement. In other words, 0.0 rating is perfect, and so on.

In order to more clearly define the present invention, the following specific examples are given. It is to be understood, however, that this is merely intended in an illustrative and not in a limitative sense. In the examples, all parts and percents are by weight unless otherwise indicated.

EXAMPLE I

In this Example the polyaromatic amine was made by the reaction of m-phenylenediamine (m-PDA) with resorcinol (Res.) in equimolar parts. HCl was used as the catalyst in the following recipe:

|       | Mole | Grams |
|-------|------|-------|
| m-PDA | 1.0  | 108   |
| Res.  | 1.0  | 110   |
| HCl   | 0.1  | 3.65  |

The m-PDA and Res. were premixed and charged to a three-necked round bottom flask. The HCl catalyst was added and heating started with the temperature taken from room temperature up to 315° C. as rapidly as possible. Melting of the charge occurred at about 60°–70° C. When most of the solid had melted, a stream of nitrogen gas introduced into the melt by means of a dip tube which provided agitation of the mixture. The reaction mixture was held at 315° C. for a period of ½ hour. Thereafter the heat was removed and a stream of air was directed over the flask. When the temperature had dropped to 250° C., the batch was quenched by pouring into a mixture of ice and water with agitation. The polyaromatic amine was then filtered off and air-dried at room temperature. The softening point of the polyaromatic amine or resin was 111° C.

The polyaromatic amine was then dissolved in 0.25 normal NaOH to give a 1.5% by weight coating solution. The internal surfaces of the reactor were coated with said solution and then rinsed with water. The following recipe was then charged to the reactor in usual fashion:

| Vinyl chloride        | 1000 gms. |
|-----------------------|-----------|
| Water (demineralized) | 2055 gms. |
| Vinol 540*            | 0.5 gram  |
| SBP** (catalyst)      | 0.5 cc.   |

*89% hydrolyzed polyvinyl acetate
**di-secondary butyl peroxydicarbonate

The reaction was carried out with a full reactor, that is, sufficient water was added to fill the reactor, and at a temperature of 57° C. with agitation. The reaction was continued with addition of water as the mixture shrank because of formation of polymer in order to keep the reactor full. The reaction was discontinued upon the addition of 400 grams of water. The contents of the reactor were removed in usual fashion and the internal surfaces classified in accordance with the aforementioned procedure for rating said surfaces. The rating was as follows: paper build-up 0.0 and sandy build-up (on top of blades of agitator) 0.1. It can readily be seen that the coated reactor was far superior to the control, or uncoated reactor, which had a rating of 1.5.

EXAMPLE II

In this Example the procedure of Example I was followed in making the polyaromatic amine except that $H_3PO_4$ was used as catalyst in place of HCl and the temperature was carried to 270° C. and then stopped. The resultant condensation product of m-PDA and Res. had a softening point of 65° C. The polyaromatic amine was then dissolved in 0.25 N NaOH to give a 1.5% solution. The coating solution was applied to the inner surfaces of the reactor and then rinsed with water. The same polymerization recipe and the same reaction conditions, as recited in Example I, were used. At the end of the polymerization and after removal of the contents from the reactor, the inner surfaces were exceptionally clean with the ratings being: paper build-up 0.0 and sandy build-up 0.05.

EXAMPLE III

In this Example the polyaromatic amine was made by condensing m-PDA (0.2 mole) with bisphenol A (BPA) (0.4 mole) in the presence of HCl (0.02 mole) as catalyst. The temperature of the reaction mixture was raised to 200° C. and held there for ½ hour. Heating and stirring was then stopped and the reaction product poured out. Upon cooling, the reaction product was a dark brown, sticky resin. The softening point was too low to determine. The product was then dissolved in 0.25 Normal NaOH to give a 1.5% solution. This solution was applied to the reactor surfaces and then rinsed with water. The recipe and procedure of Example I was used in the subsequent polymerization reaction. After removal of the contents from the reactor the surfaces were rated 0.0 paper build-up and 1.0 sandy build-up.

EXAMPLE IV

In this Example the polyaromatic amine used was the self-condensation product of m-aminophenol. 54.5 grams of m-aminophenol (0.5 mole) was charged to a three-necked round bottom flask equipped with a thermometer and short air condenser. A magnetic stirrer was employed. 4.2 ml. of HCl catalyst (0.05 mole) was added and heating started. The reaction medium was heated to 175° C. and held at that temperature for a period of 4 hours. Upon removal of the heat and cooling the product formed was a black, sticky resin with a softening point too low to be determined. The product was then dissolved in 0.25 Normal NaOH to give a 1.5% coating solution which was applied to the reactor surfaces and rinsed with water. The reactor was charged with the recipe of Example I and polymerized in the same manner. Upon removal of the contents of the reactor, the surfaces were extremely clean with ratings of 0.0 paper build-up and 0.0 sandy build-up.

EXAMPLE V

Here the polyaromatic amine was prepared by the condensation reaction of three components, namely, 0.5 mole of m-phenylenediamine (m-PDA) 0.5 mole of resorcinol (Res.) and 0.5 mole of p-aminophenol (PAP). The reactants were melted together with stirring. 6.2 ml. HCl were added and the mixture heated to 250° C. at which point a sample was removed and it formed a hard resin at room temperature. The contents were poured out and upon cooling there was formed a dark-colored, brittle resin which had a softening point of 78° C. The polyaromatic amine thus formed was then dissolved in 0.5 Normal NaOH to give a 1.5% coating solution which was applied to the reactor surfaces and rinsed with water. Again the reactor was charged with the recipe of Example I and polymerized under the same conditions as therein recited. After emptying the reactor, the surfaces were very good with just a few spots of paper and sandy build-up. The ratings were 0.2 paper build-up and 0.2 sandy build-up.

EXAMPLE VI

In this Example the polyaromatic amine was made by the condensation reaction of 4 components in the following proportions:

|  | Grams | Moles |
|---|---|---|
| (1) m-phenylenediamine (m-PDA) | 21.6 | 0.20 |
| (2) Resorcinol (Res.) | 16.5 | 0.15 |
| (3) Phloroglucinol | 8.1 | 0.05 |
| (4) m-aminophenol | 21.8 | 0.20 |

The above reactants were blended together in a beaker and then transferred to the reaction flask. 2.5 ml. HCl were added and heating begun. The reaction mixture was stirred as soon as possible. It was found that the reaction product was solid upon cooling when a temperature of 260° C. was reached. The contents were then poured out and cooled. The polyaromatic amine was a hard, brittle, dark-red resin and had a softening point of 68° C. The resin was then dissolved in 0.5 Normal NaOH to give a 1.5% coating solution. The solution was applied to the surfaces of the reactor and then rinsed with water. The same polymerization procedure and recipe of Example I was again employed. After the contents of the reactor were removed it was noted that surfaces were in excellent condition and free of build-up. The ratings were 0.0 paper build-up and 0.0 sandy build-up.

EXAMPLE VII

In this Example a halogenated component was used. There was used 0.15 mole of m-PDA (16.2 grams) and 0.15 mole of 4-chlororesorcinol (21.7 grams) which were charged to the reaction flask. Thereafter 1.3 ml. of HCl was added and heating begun. The temperature was taken to 275° C. and the heat removed. The product was very viscous and poured with difficulty at 275° C. When cooled, the cold resinous polyaromatic amine resembled coke. The softening point was too high to obtain. Sufficient of the product was added to 0.5 Normal NaOH to give a 1.5% solution. However, it did not dissolve and the total dissolved product solids content was 0.6%. The solution was applied to the reactor surfaces and rinsed with water. The polymerization procedure and recipe of Example I was used. Upon completion of the polymerization and removal of the contents from the reactor the inner surfaces were examined and found to be in excellent shape. The ratings were 0.0 paper build-up and 0.0 sandy build-up.

EXAMPLE VIII

In this Example o-aminophenol was self-condensed. 54.5 grams of o-aminophenol (1.0 mole) was charged to the reaction flask. 4.2 ml. of HCl catalyst (0.05 mole) was added and heating started. The reaction medium was heated to 175° C. with stirring as soon as the charge was fluid enough to allow it. The temperature was held at 175° C. for a period of 4 hours. Thereafter the reaction product was poured out and allowed to cool. The cooled product was a black, sticky tar and accordingly the softening point was too low to determine. The product was then dissolved in 0.5 Normal NaOH to give a 1.5% coating solution. The solution was then applied to the surfaces of the polymerization reactor and rinsed with water. The reactor was charged with the recipe of Example I and polymerized in the same manner. After removing the contents from the reactor, the surfaces were found to be very clean with ratings of 0.0 paper build-up and 0.0 sandy build-up.

EXAMPLE IX

The polyaromatic amine produced in Example I, namely, the condensation reaction product of m-PDA and Resorcinol, was dissolved in 0.25 Normal potassium hydroxide in sufficient amount to give a 1.5% coating solution. The solution was applied to the reactor surfaces and then rinsed with water. The polymerization reaction was conducted as in Example I. Upon removal of the contents from the reactor, the surfaces were free of paper build-up and only little bits of sandy build-up scattered on the baffle and agitator shaft and blades. The ratings were 0.0 paper build-up and 0.5 sandy build-up.

EXAMPLE X

In this Example the polyaromatic amine was made by condensing 2,4-toluenediamine monohydrochloride with resorcinol without the use of catalyst, since in using the monohydrochloride form, sufficient HCl was present to catalyze the reaction. The two ingredients were mixed in a beaker in the following amounts:

100 gms. 2,4-toluenediamine monohydrochloride
69.3 gms. resorcinol

After mixing, the mixture was transferred to a three necked round bottom flask and heating begun with stirring. The mixture was heated to 250° C. over a period of 2½ hours and then the contents were removed. Upon cooling the reaction product was a hard, brittle resin having a softening point of 129° C. The product was dissolved in 0.5 Normal NaOH to give a 1.5% solution. The solution was then applied to the reactor surfaces and rinsed with water. The recipe and procedure of Example I was used in the subsequent polymerization reaction. After removal of the contents from the reactor, the surfaces were rated 0.0 paper build-up and 0.2 sandy build-up.

Coating of the internal surfaces of the polymerization reactor, in accordance with the present invention, substantially reduces, and in many cases, practically eliminates polymer build-up on said surfaces during the polymerization reaction and thus results in increased production over a unit period of time. In those instances where a little polymer build-up does accumulate on the interior surfaces, it is not of the hard, rough, difficult-to-remove type and is easily removed without employing the difficult tedious scraping methods that are presently necessary in the art. More importantly, the present invention enables one to operate a closed polymerization system, which in the case of vinyl chloride polymerization, it has the advantage of reducing the parts per million of vinyl chloride in the atmosphere of the plant drastically.

In the case of any of the herein disclosed polyaromatic amines, and employing the procedures of any of the above Examples, the cycle is repeated with each batch without opening the polymerizer. This is accomplished by using spray nozzles mounted in the dome of the reaction vessel or polymerizer, spraying the coating solution on the interior surfaces, draining, and recovering, if desired, spraying with water through the same nozzles, draining and then charging the polymerization mixture. After polymerization, the contents are removed and the interior rinsed with water by means of the spray nozzles. Thereafter the cycle is repeated without opening the reactor. Numerous other advantages of the present invention will be apparent to those skilled in the art.

While the present invention has been described in terms of its specific embodiments, certain modifications and equivalents will be apparent to those skilled in the art and are intended to be included within the scope of the present invention, which is to be limited only by the scope of the appended claims.

We claim:

1. A process for substantially eliminating the build-up of polymers on the internal surfaces of a polymerization reaction vessel which comprises applying to said surfaces a coating solution comprised of a straight chain or branched polyaromatic amine having a molecular weight greater than about 250 and having at least 2 —OH groups per 1000 molecular weight dissolved in an aqueous alkali metal hydroxide solution, said polyaromatic amine having the structure selected from the group consisting of

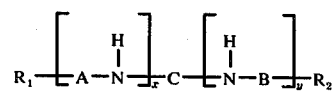

wherein (1) A, B, and C are selected from the group consisting of

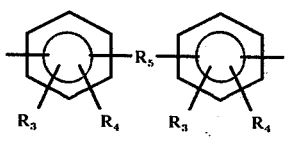

wherein $R_3$ is —H, halogen, or an alkyl group containing from 1 to 8 carbon atoms and may be the same or different; $R_4$ is —H, —OH, —NH$_2$ or an alkyl group containing from 1 to 8 carbon atoms and may be the same or different; and $R_5$ is

or a straight chain or branched alkylene or alkylidene group containing from 1 to 5 carbon atoms; and (b)
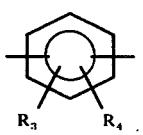

wherein $R_3$ and $R_4$ are the same as for (a); and wherein A, B, and C may be the same or different and each repeating unit may be the same or different; (2) $R_1$ and $R_2$ are either —H, —OH, —NH$_2$, or

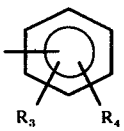

and may be the same or different and wherein $R_3$ and $R_4$ are the same as for (a); and (3) $x$ is an integer from 1 to 20 and $y$ is an integer from 0 to 20; and II.
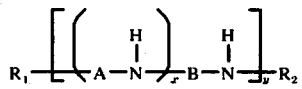

wherein (4) A, B, $R_1$, $R_3$, $R_4$ and $R_5$ are the same as in I and $R_2$ is —H, or

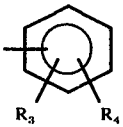

as defined in (2); and (5) $x$ is an integer from 1 to 4 and $y$ is an integer from 1 to 15.

2. A process as defined in claim 1 wherein the polyaromatic amine has the structure (I).

3. A process as defined in claim 1 wherein the polyaromatic amine has the structure (II).

4. A process as defined in claim 1 wherein the polyaromatic amine is the reaction product of a polyamino benzene having the formula

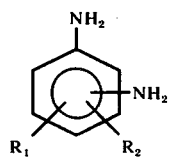

wherein $R_1$ is —H, —NH$_2$, —OH or an alkyl group containing from 1 to 8 carbon atoms; and $R_2$ is —H, halogen or an alkyl group as defined for $R_1$, and a polyhydric phenol having the formula

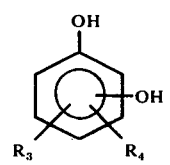

wherein $R_3$ is —H, —NH$_2$, —OH or an alkyl group containing from 1 to 8 carbon atoms; and $R_4$ is —H, halogen or an alkyl group as defined for $R_3$.

5. A process as defined in claim 1 wherein the polyaromatic amine is the reaction product of a polyamino benzene having the formula

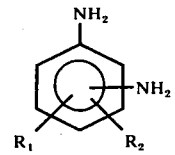

wherein $R_1$ is —H, —NH$_2$, —OH or an alkyl group containing from 1 to 8 carbon atoms; and $R_2$ is —H, halogen, or an alkyl group as defined for $R_1$, and a compound selected from the group consisting of diphenylamines, alkyl-substituted diphenylamines and other compounds all having the formula

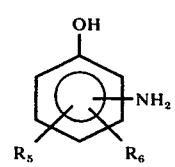

wherein R is $$-\overset{H}{\underset{|}{N}}-$$

or a straight chain or branched alkylene or alkylidene group containing from 1 to 15 carbon atoms; and $R_1$, $R_2$, $R_3$ and $R_4$ may each be —H, —NH$_2$, —OH, halogen or an alkyl group containing from 1 to 8 carbon atoms and at least 1 of which is —OH.

6. A process as defined in claim 1 wherein the polyaromatic amine is the reaction product of a polyamino benzene having the formula wherein $R_1$ is —H, —NH$_2$, —OH or an alkyl group containing from 1 to 8 carbon atoms; and $R_2$ is —H, halogen or an alkyl group as defined for $R_1$, and an aminophenol or an alkyl-substituted aminophenol having the formula wherein $R_5$ is —H, —NH$_2$, —OH or an alkyl group containing from 1 to 8 carbon atoms; and $R_6$ is —H, —NH$_2$, halogen or an alkyl group as defined for $R_5$.

7. A process as defined in claim 1 wherein the polyaromatic amine is the reaction product of an aminophenol or an alkyl-substituted aminophenol having the formula

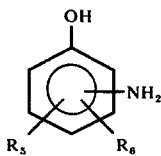

wherein $R_5$ is —H, —$NH_2$, —OH or an alkyl group containing from 1 to 8 carbon atoms; and $R_6$ is —H, —$NH_2$, halogen or an alkyl group as defined for $R_5$, and a compound selected from the group consisting of diphenylamines, alkyl-substituted diphenylamines and other compounds all having the formula

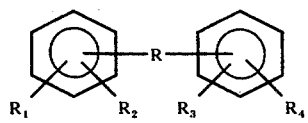

wherein R is

or a straight chain or branched alkylene or alkylidene group containing from 1 to 5 carbon atoms; and $R_1$, $R_2$, $R_3$ and $R_4$ may each be —H, —$NH_2$, —OH, halogen or an alkyl group containing from 1 to 8 carbon atoms and at least one of which is —OH or —$NH_2$.

8. A process as defined in claim 1 wherein the polyaromatic amine is the reaction product of a polyhydric phenol having the formula

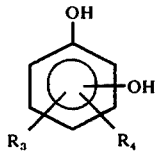

wherein $R_3$ is —H, —$NH_2$, —OH or an alkyl group containing from 1 to 8 carbon atoms; and $R_4$ is —H, halogen or an alkyl group as defined for $R_3$, and a compound selected from the group consisting of diphenylamines and alkyl-substituted diphenylamines and other compounds all having the formula

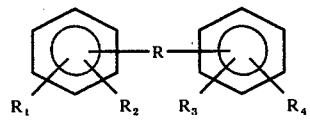

wherein R is

or a straight chain or branched alkylene or alkylidene group containing from 1 to 5 carbon atoms; and $R_1$, $R_2$, $R_3$ and $R_4$ may each be —H, —$NH_2$, —OH, halogen or an alkyl group containing from 1 to 8 carbon atoms and at least 1 of which is —$NH_2$.

9. A process as defined in claim 1 wherein the coating solution contains from about 0.10% to about 20.0% by weight of the polyaromatic amine.

10. A process as defined in claim 1 wherein the alkali metal hydroxide is sodium hydroxide.

11. A process as defined in claim 1 wherein the alkali metal hydroxide is potassium hydroxide.

12. A process as defined in claim 1 wherein the alkali metal hydroxide is lithium hydroxide.

13. A process as defined in claim 1 wherein the polyaromatic amine has a molecular weight in the range of about 250 to about 1000.

14. A process as defined in claim 1 wherein the polyaromatic amine is the reaction product of m-phenylenediamine and resorcinol.

15. A process as defined in claim 1 wherein the polyaromatic amine is the reaction product of m-phenylenediamine and bisphenol A.

16. A process as defined in claim 1 wherein the polyaromatic amine is the reaction product of o-phenylenediamine and resorcinol.

17. A process as defined in claim 1 wherein the polyaromatic amine is a self-condensed aminophenol.

18. A process as defined in claim 14 wherein the alkali metal hydroxide is sodium hydroxide.

19. A process as defined in claim 18 wherein the concentration of sodium hydroxide in the aqueous solution is from about 0.1% to about 25.0% by weight.

20. A process as defined in claim 19 wherein the coating solution contains from about 0.10% to about 20.0% by weight of the polyaromatic amine.

21. A process as defined in claim 1 wherein the polyaromatic amine has a softening point in the range of about 65° C. to about 150° C.

22. A process as defined in claim 20 wherein the polyaromatic amine has a softening point in the range of about 65° C. to about 150° C.

23. A process as defined in claim 1 wherein the polyaromatic amine is the reaction product of m-phenylenediamine, resorcinol and p-aminophenol.

24. A process as defined in claim 1 wherein the polyaromatic amine is the reaction product of m-phenylenediamine, resorcinol, phloroglucinol and m-aminophenol.

25. A process as defined in claim 1 wherein the polyaromatic amine is a self-condensed reaction product containing at least one —OH group and at least one —$NH_2$ group.

* * * * *